United States Patent [19]

Yoshida et al.

[11] Patent Number: 4,752,849

[45] Date of Patent: Jun. 21, 1988

[54] CARRIAGE SUPPORT STRUCTURE

[75] Inventors: Shinobu Yoshida; Kihachiro Tanaka; Taro Sonoda, all of Ibaraki, Japan

[73] Assignee: Hitachi, Ltd.

[21] Appl. No.: 865,374

[22] Filed: May 21, 1986

[30] Foreign Application Priority Data

May 22, 1985 [JP] Japan ................... 60-108103

[51] Int. Cl.$^4$ ............................................. G11B 5/56
[52] U.S. Cl. ..................................... 360/106; 360/109
[58] Field of Search ............... 360/106, 109, 97–99, 360/104

[56] References Cited

U.S. PATENT DOCUMENTS 4,414,594 11/1983 Farmer et al. ..................... 360/106
4,415,941 11/1983 Gibeau et al. ...................... 360/106
4,418,370 11/1983 Harrison ............................. 360/106

Primary Examiner—John H. Wolff
Attorney, Agent, or Firm—Antonelli, Terry & Wands

[57] ABSTRACT

A carriage in a position control mechanism using an access mechanism of a magnetic disk device or a linear motor is supported linearly movable in parallel to a positioning reference plane on a stationary side by means of a carriage support mechanism. The carriage support mechanism is composed of support units rigidly engaged with the carriage or the stationary side and support units elastically engaged with the carriage or the stationary side. The rigidly and elastically engaged units are selectively arranged so that the carriage is prevented from being inclined by thermal deformations due to the heat generation caused upon the driving of the carriage.

15 Claims, 6 Drawing Sheets

CARRIAGE SUPPORT STRUCTURE

BACKGROUND OF THE INVENTION

1. Field of the Invention

The present invention relates to a support structure for a carriage carrying thereon voice coils for drive in such a manner that the voice coils are linearly movable in parallel with a reference plane. More particularly, it relates to a support structure for a carriage which is linearly movable in a radial direction of a disk to form a linear access mechanism.

2. Description of the Prior Art

A carriage which is linearly movable in parallel with a reference plane has been often used in, for example, a linear access mechanism of a magnetic disk device. The linear access mechanism of the magnetic disk device needs a positioning performance having an extremely small positional error. This is inevitable in dense recording/reproducing demands. To improve the performance of the device, there have been various carriage support structures. In the linear carriage support structures, a carriage supporting guide arms having magnetic heads at their distal ends is supported at its underside, so that a pitching will be caused due to a rocking upon the drive or stop or the turbulence in a travel of the carriage, and an error will be generated in the track direction. To improve a dynamic property against such an external turbulence or during the drive, both sides of the carriage are supported so as to suppress deviation of the carriage from the linear motion with rigidity of bearings which supports the carriage, as shown in, for example, U.S. Pat. No. 4,415,941. In such a structure, however, since six support units of the support means are arranged with three of them above the centerline of the carriage and the other below the centerline thereof, the carriage is resiliently deformed and the guide arms are vibrated in directions outside a predetermined plane so that the heads are displaced from the linear motion, resulting in the error generation in reproducing (reading) and recording (writing). In order to cope with this problem, there has been proposed a support structure for a carriage, in which eight support units are used in a support means with half the support units being located on each side of the front and rear sides of the carriage, thereby suppressing the generation of error against the external factor or the like. However, although this support structure is intended to improve the dynamic property to enhance the positioning performance, another problem of reading and describing errors caused by thermal deformation due to heat generation of a voice coil motor for linearly moving the carriage must be solved simultaneously with the improvement of the performance. If such a problem of thermal deformation would not be solved, the carriage would be inclined due to the thermal deformation so that errors in the disc radial direction, i.e., tracking direction would be generated between a servo head for reading out the positional informations and a data head for writing the data. Now, assume that, in the magnetic disk device, the access direction be expressed by an x-axis, a y-axis be set in a plane parallel to the disk, and a z-axis be determined so as to be perpendicular to that plane. In general, a carriage or a fixing portion to which a support member for the carriage is fixed is made of aluminum in order to make the structure light in weight and to improve the machining property. On the other hand, the support member is made of ferric material having a good anti-sliding property. In such a case that a thermal expansion coefficient of the support member is smaller than that of the other member, when the temperature is elevated, a gap or clearance is liable to be created between the support member and the carriage and to be filled with the support member so that the carriage is inclined around the y-axis. When the carriage is inclined around the y-axis, the position of the servo head is displaced as described before, resulting in the generation of positional errors in reading and writing.

Therefore, it is necessary to provide the support structure for the carriage, in which the thermal deformation does not cause the errors in reading and writing.

SUMMARY OF THE INVENTION

An object of the invention is to provide a carriage support structure which is capable of obtaining a moving mechanism having a good positioning performance without any inclination of a carriage against thermal deformation due to the heat generation caused by an acuator for driving the carriage or the like.

A shift component, which causes a problem due to the thermal deformation, of the carriage is a rotation around a y-axis. The generation of this rotational component is due to the fact that shifts in a z-direction of the carriage are different from each other at front and rear positions of support of the carriage. Assuming that the disc side of the carriage be the front side and the opposite side thereto be the rear side, if the shifts in the z-direction at the front and rear support positions of the carriage are the same, there will be generated no rotational component around the y-axis. Therefore, if predetermined support portions of the support means for supporting the carriage are elastically engaged with the carriage and/or the stationary side so that the shifts in the z-direction at the front and rear support positions of the carriage are made equal to each other, any inclination with respect to the y-axis of the carriage is not generated.

According to the present invention, when the carriage is divided into four regions by a plane passing through a gravitational center of the carriage in parallel to the positional reference plane and a plane perpendicular to the plane in parallel to the positional reference plane, at least two support portions of support means for engaging rigidly or elastically with the carriage and/or the stationary side are located in each of the four regions and four or more support portions are located on two planes perpendicular to the moving direction of the carriage or in the vicinity of the two planes perpendicular to the moving direction of the carriage, and two support portions for rigidly engaging are located within each of first and second regions, a single support portion for rigidly engaging and at least one support portions for elastically engaging are located in a third region, and at least two support portions for elastically engaging are located in a fourth region.

DETAILED DESCRIPTION OF THE PREFERRED EMBODIMENTS

Figure 1A:
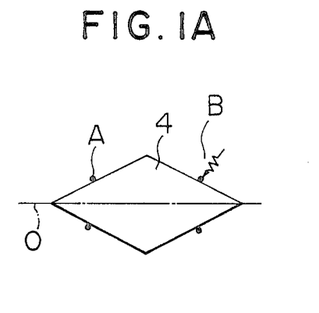
FIGS. 1A, 1B, 2A, 2B, 3A and 3B show cross-sections perpendicular to the carriage moving direction in the basic carriage support structures, FIGS. 1A, 2A and 3A showing the cross-sections on the front side in the carriage moving direction and FIGS. 1B, 2B and 3B showing the cross-sections on the rear side in the carriage moving direction.
Figure 1B:
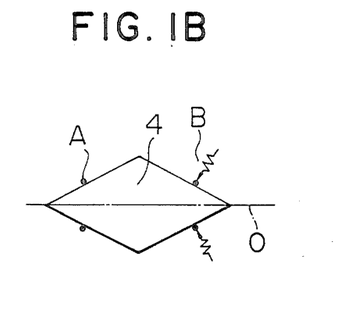
Figure 2A:
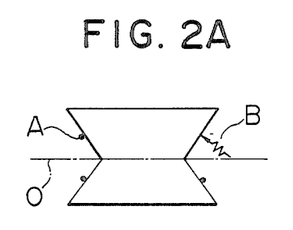
Figure 2B:
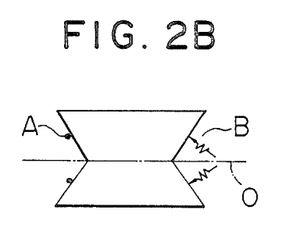
Figure 3A:
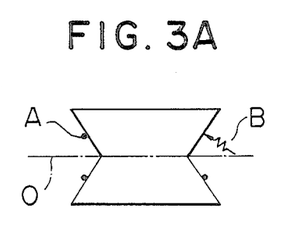
Figure 3B:
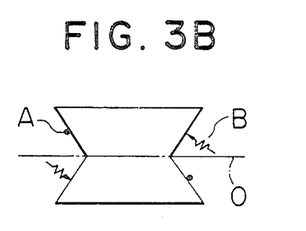

FIGS. 1A and 1B, 2A and 2B, and 3A and 3B show, respectively, three models of cross-section perpendicular to a carriage moving direction, which models are basic support structures for carriages in accordance with the invention. In any case, a single support means has a single support portion. FIGS. 1A, 2A and 3A are cross-sections on the front side in the carriage moving direction, that is, cross-sections of the portions opposite to the actuator mounting portion, whereas FIGS. 1B, 2B and 3B are cross-sections on the rear side in the carriage moving direction, that is, cross-sections of the actuator mounting portion. In the cross-sections shown, reference numeral 4 denotes a carriage, reference character A denotes a support portion of a support means which is rigidly coupled to the carriage, and reference character B denotes a support portion of a support means which is elastically or resiliently coupled to the carriage.

FIGS. 1A and 1B show the basic structure in which a support force of the support means is exerted inwardly with respect to a horizontal plane O in the carriage moving direction. FIGS. 2A and 2B show the basic structure in which a support force of the support means is exerted outwardly with respect to the horizontal plane O. FIGS. 3A and 3B show the basic structure in which a support force of the support means is also exerted outwardly with respect to the horizontal plane O and a restricting force against the rolling around the x-axis is large. Any of these structures is stable against the external factors and may provide a carriage support structure including a moving mechanism having an excellent positioning performance against the thermal deformation. It is also available, in preventing the errors caused by the thermal deformation, to add to the above-described basic support means another support means having a support portion elastically engaged with the carriage.

Also, the single support means may have two support portions.

Figure 4:
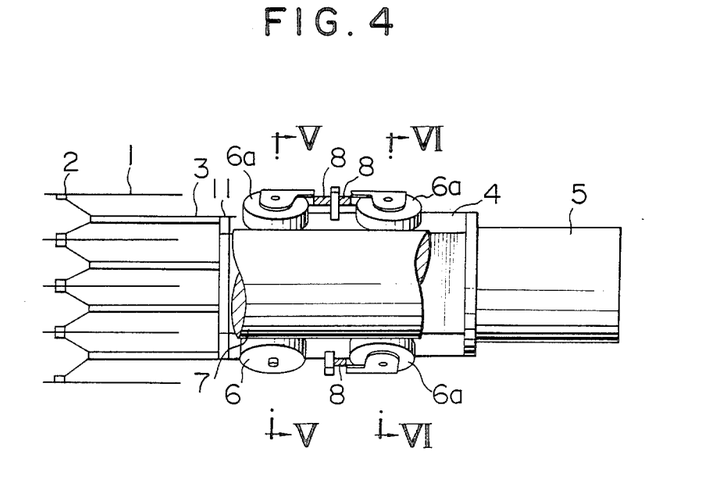
FIG. 4 is a side elevational view of the carriage support structure in accordance with an embodiment of the invention.
Figure 5:
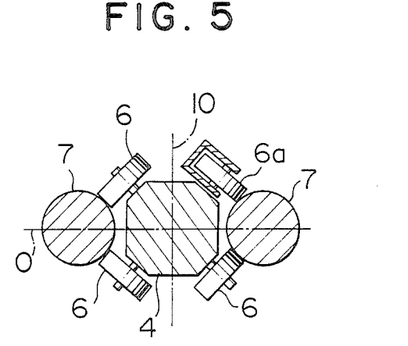
FIG. 5 is a cross-sectional view taken along the line V—V of FIG. 4.
Figure 6:
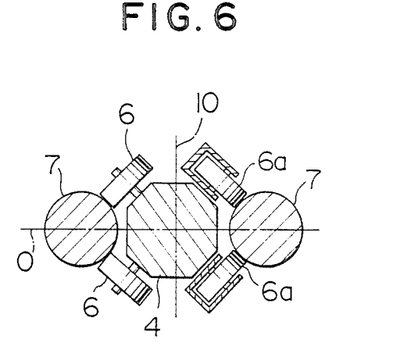
FIG. 6 is a cross-sectional view taken along the line VI—VI of FIG. 4.
Figure 7:
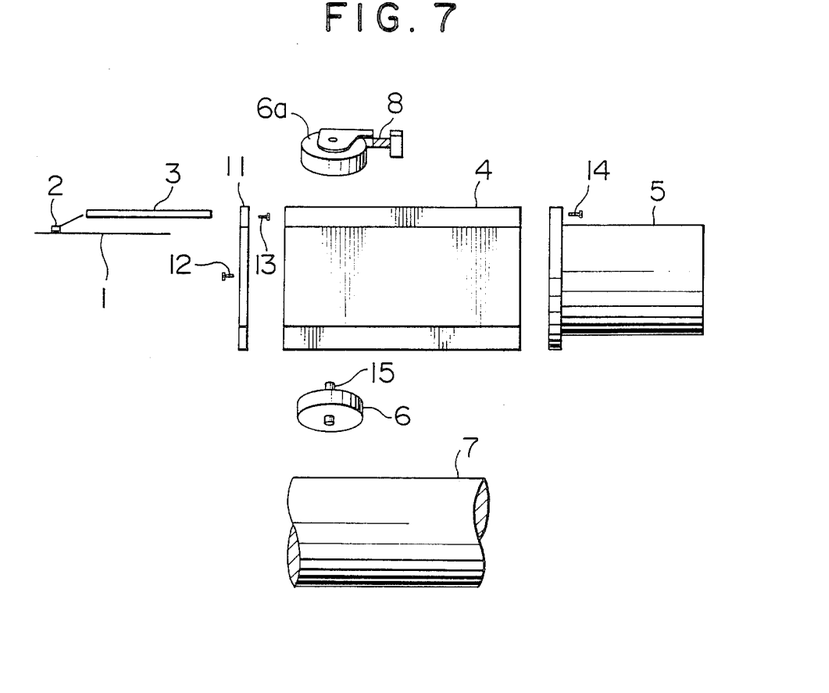
FIG. 7 is an exploded view of the structure shown in FIG. 4.

With reference to FIGS. 4 to 7, one embodiment will now be described in which the support structure for the carriage according to the present invention is applied to an access mechanism for a magnetic disk device. FIG. 4 is a side elevational view of the embodiment, FIG. 5 is a cross-sectional view taken along the line V—V of FIG. 4 and FIG. 6 is a cross-sectional view taken along the line VI—VI of FIG. 4. It is to be noted that, in this embodiment, the support means of the carriage has a single support portion. One or more guide arms 3 for supporting magnetic heads 2 are coupled by bolts 13 to a guide arm support plate 11 which in turn is coupled to the carriage 4 by a bolt 12. To the carriage 4, there is connected a voice coil 5 by bolts 14, which voice coil is used as an actuator. A pair of support rails 7 for the carriage 4 are provided along the moving direction of the carriage 4 on both sides of the carriage 4. Rollers 6 which serve as support portions of the support means for the carriage 4 are fixed through pins 15 to the carriage 4, whereas rollers 6a are fixed to the carriage 4 through leaf springs 8 which are spring members. The couplings through the pins 15 and the leaf springs 8 cause the support means, that is, the rollers 6 and 6a to be engaged with the carriage 4 in a rigid fashion and in an elastic fashion, respectively. When the carriage 4 is divided into four regions by the horizontal plane O in parallel to the disk 1 and a plane 10 perpendicular to the disk, both the planes passing through a gravitational center of the carriage, each region includes two rollers 6 or 6a. As shown in FIGS. 5 and 6, in the eight rollers 6 and 6a arranged in two planes perpendicular to the moving direction of the carriage 4, the rollers 6 which belong to the left upper and left lower regions are fixed through the pins 15 to the carriage 4 in a rigid engagement whereas three 6a of the rollers 6 and 6a which belong to the right upper and right lower regions are elastically depressed by the leaf springs 8 in an elastic engagement. The support forces of these rollers 6 and 6a are directed toward the outside with respect to the plane O parallel with the disk 1.

When an electric current flows through the voice coil 5 of the access mechanism, a Lorentz's force is exerted to the voice coil 5 so that the carriage 4 will be reciprocatingly moved along the rails 7 through the rollers 6 and 6a which are the support means. In the access mechanism of the embodiment, a case in which a thermal deformation is generated due to the heat generated caused by, for example, the motor for rotating the disc or the motor for the voice coil will be explained with reference to FIGS. 8A and 8B.

Figure 8A:
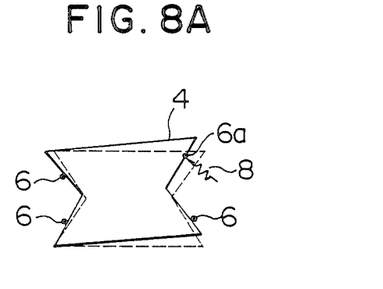
FIGS. 8A and 8B are schematic view for illustrating the carriage shifts upon the generation of thermal deformation in the embodiment shown in FIG. 4.
Figure 8B:
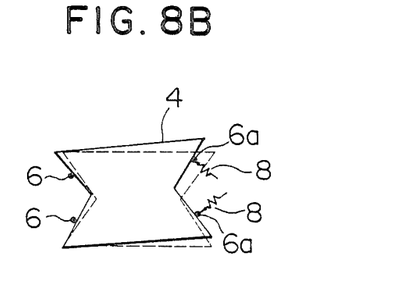

FIGS. 8A and 8B schematically show the states shown in FIGS. 5 and 6.

When thermal deformations are generated in the carriage 4, the rails 7, the rollers 6 and 6a and the like, due to the difference among these components, the carriage 4 will be shifted from the normal position shown by the dotted lines in FIGS. 8A and 8B, and gaps are liable to be created between the rails and the rollers 6 and 6a. However, by the action of the three rollers 6a which are elastically engaged with the carriage 4 through the leaf springs 8, the rollers have been already brought into contact with the rails 7. For this reason, the carriage 4 is shifted as shown by the solid lines in FIGS. 8A and 8B, there is no shift around the y-axis, there is no inclination of the carriage 4 with respect to the plane parallel with the disk, and there is no positional error in reading and writing of the head 2.

It may be numerically estimated, by numerical simulations, that the carriage support structure prevents the positional errors against the temperature increase. According to the embodiment of the invention, the positional errors in the access direction caused by the inclination of the carriage due to the thermal deformation is expressed in an order of $10^{-2} \mu m$ in terms of the relative error estimation between the central head position and the position located most remotely from the central head. On the other hand, a support structure other that of the present invention, for example, a structure which has the cross-section on the front side as shown in FIG. 5 and the cross-section on the rear side as shown in FIG. 6 but has a replaced positional relation in which the rigid engagement rolls 6 are replaced by the elastic engagement rolls 6a will be discussed. The positional error of this arrangement is in an order of $10^{-1} \mu m$ in accordance with the abovedescribed estimation. Thus, it is apparent that, according to the present invention, the positional precision is considerably enhanced against the thermal deformation.

Figure 9:
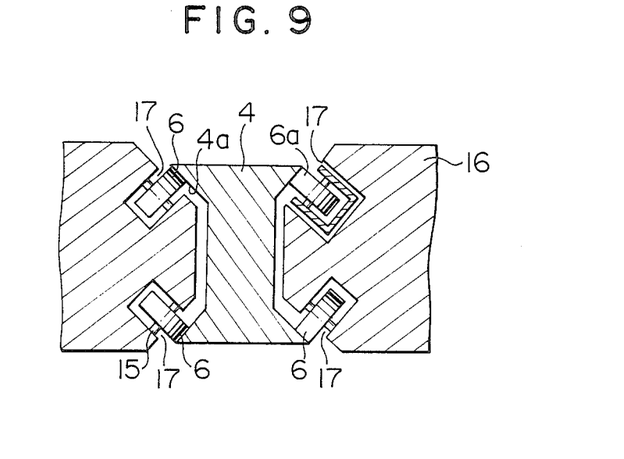
FIGS. 9, 10, 11 and 12 are cross-sectional views of the carriage support structures in accordance with other embodiments, corresponding to the cross-sections shown in FIGS. 5 and 6.
Figure 10:
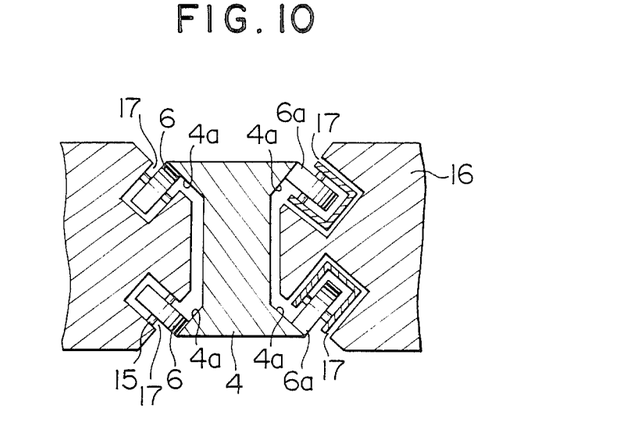

FIGS. 9 and 10 show another example of the carriage support structure according to the invention, corresponding to the sections shown in FIGS. 5 and 6.

In this embodiment, roller mounting recess portions 17 are formed on the fixed portion 16 side, the rollers 6 are provided in the recess portions 17 through the pins 15, and the rollers 6a are provided in the recess portions 17 through the leaf spring (not shown). These rollers 6 and 6a support the carriage 4 in engagement with rail portions 4a formed in peripheral surfaces of the carriage 4. The positions of the rigidly engaged rollers 6 and the elastically engaged rollers 6a are the same as those shown in the preceding embodiment.

In such a structure, since the rollers 6 and 6a are not mounted on the carriage 4, it is possible to reduce the weight of the moving parts to enhance the moving speed of the carriage. Therefore, when the support structure is applied to the magnetic disk device, the access time may be reduced.

Figure 11:
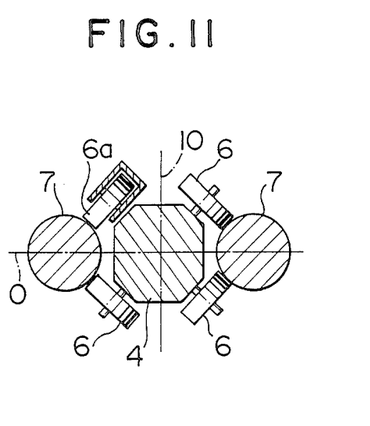
Figure 12:
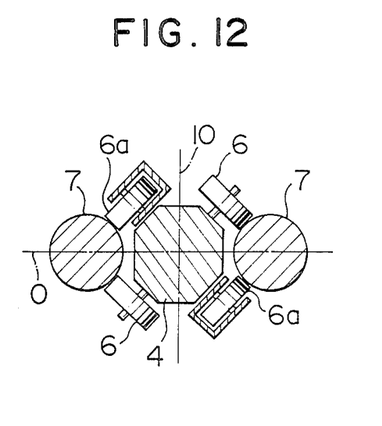

FIGS. 11 and 12 show another example of the carriage support structure according to the invention, corresponding to the sections in the first mentioned embodiment shown in FIGS. 5 and 6. In the embodiment shown in FIGS. 11 and 12, the arrangement of the rigidly engaged rollers 6 and the elastically engaged rollers 6a in the above-described four regions are different from that in the foregoing embodiments. If the arrangement meets the minimum requirement of the abovedescribed basic structures, the arrangement shown in FIGS. 11 and 12 is applicable.

Although not shown, a plurality of elastically engaged rollers may be arranged at the position of the support portion elastically engaged with the carriage, instead of the single roller. With such an arrangement, it is possible to reduce loads imposed on the rollers and to prolong a service life of the rollers with a high reliability.

Figure 13:
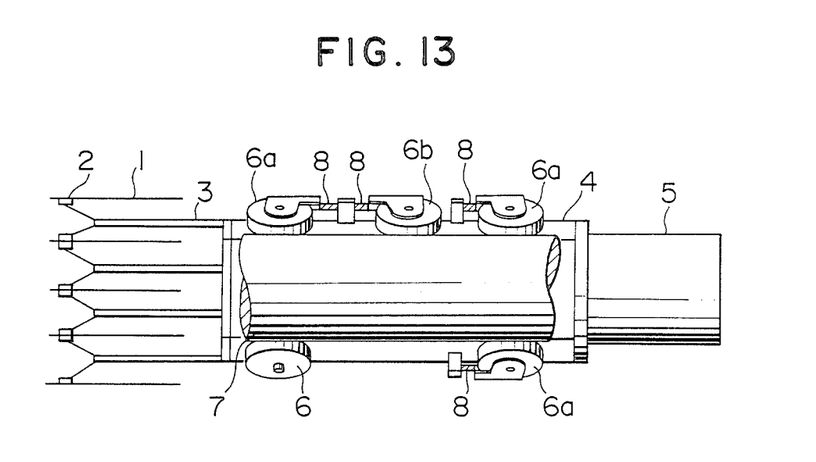
FIG. 13 is a side elevational view of the carriage support structure in accordance with still another embodiment.

FIG. 13 also shows another embodiment of the carriage support structure. In this embodiment, an elastically engaged roller 6b with a leaf spring 8 is added to the structure shown in FIG. 4. With such an arrangement, it is possible to obtain the same effect as that of the structure shown in FIG. 4.

It is apparent that the present invention is not limited to the arrangement shown in FIG. 13. If at least two support portions are provided in each of the four regions of the above-described carriage 4 and at least three elastically engaged support portions are provided in conformity with predetermined regions, it is possible to add to any of the foregoing embodiments the support means having any number of support portions located at any positions, resulting in preventing reading and describing errors caused by the thermal deformations.

Figure 14:
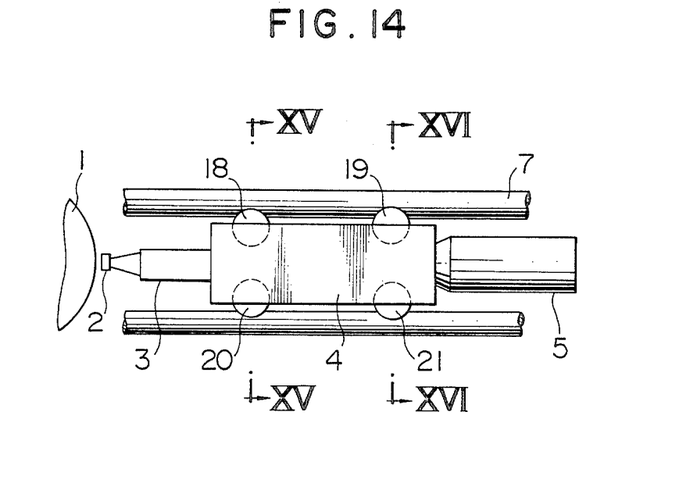
FIGS. 14 to 16 show the carriage support structure in accordance with still another embodiment, FIG. 14 being a top view of the structure, FIG. 15 being a cross-sectional view taken along the line XV—XV of FIG. 14, and FIG. 16 being a cross-sectional view taken along the line XVI—XVI of FIG. 15.
Figure 15:
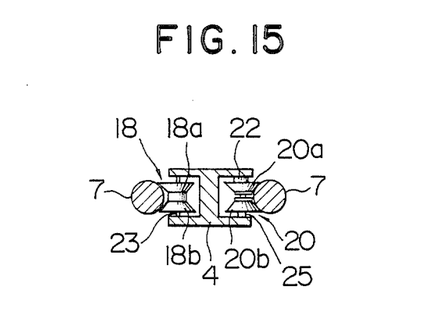
Figure 16:
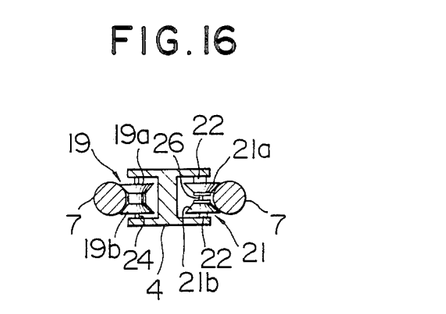

FIGS. 14 to 16 show still another embodiment of the carriage support structure according to the present invention. FIG. 14 is a top view thereof. FIGS. 15 and 16 are cross-sectional views taken along the lines XV—XV and XVI—XVI of FIG. 14, respectively, corresponding to the cross-sections shown in FIGS. 5 and 6 of the foregoing embodiment. In the embodiment shown in FIGS. 14 to 16, support means each having two support portions, for example, bobbin-shaped rollers 18, 19, 20 and 21 are used. Shafts 23, 24, 25 and 26 fixed to the carriage 4 are adapted to pass through the respective bobbin-shaped rollers 18 to 21. The bobbin-shaped roller 18 is constituted by roller portions 18a and 18b each having a single rigid support portion, the roller portions being integrally formed with each other. Also, the bobbin-shaped roller 19 is constituted by roller portions 19a and 19b each having a single rigid support portion, the roller portions being integrally formed with each other. The bobbin-shaped roller 20 is composed of a roller portion 20b having a single rigid support portion and a roller portion 20a having a single elastic engagement portion provided through a spring member 22 to the support shaft. Also, the bobbin-shaped roller 21 is composed of roller portions 21a and 21b each having a single elastic engagement portion provided through a spring member 22 to the support shaft.

With such an arrangement, it is possible to make the structure compact.

In the foregoing embodiments, although the leaf spring is used as means for elastically engaged with the carriage, the invention is not limited thereto but a member having a spring force caused by another member such as coil spring, or a member having an attractive or repulsive force such as a magnet may be used.

In the foregoing embodiment, although the support force of the support member is applied to the outside with respect to the plane O parallel to the disk, it goes without saying that the same effect may be insured also in the case where the force is applied inwardly.

Also, it goes without saying that the invention is not limited to the application of the access mechanism of the magnetic disc but may be applicable to any mechanism in which the carriage is moved in a linear motion, as in a positioning control using a linear motor.

As described above, in the carriage support structure according to the invention, any inclination of the carriage is not generated against the thermal deformation caused by the voice coil motor or the like. Thus, the positioning performance of the moving mechanism may be considerably enhanced.

We claim:

1. A support structure for a carriage on which an actuator is mounted, comprising a plurality of rollers supporting said carriage to be linearly movably in parallel to a positional reference plane, said plurality of rollers including five first rollers rigidly coupled to said carriage and at least three second rollers elastically coupled to said carriage, wherein said carriage comprises first, second, third and fourth regions in that order by a first plane passing through a gravitational center of said carriage and extending in parallel to said positional reference plane and second plane perpendicular to said first plane and said rollers are arranged such that at least two of said rollers are located in each of said first to fourth regions and at least four of said rollers are located in the vicinity of each of two planes perpendicular to a moving direction of said carriage, and such that two of said first rollers are located in each of said first and second regions, one of said first rollers and at least one of said second rollers are located in said third regions, and at least two of said second rollers are located in said fourth region.

2. A support structure as defined in claim 1, wherein said rollers supporting said carriage are arranged such that support force of said rollers is directed outwardly with respect to a plane parallel to said positional reference plane of said carriage.

3. A support structure as defined in claim 1, wherein said rollers supporting said carriage are arranged such that support force of said rollers is directed inwardly with respect to a plane parallel to said positional reference plane of said carriage.

4. A support structure for a carriage on which an actuator is mounted, comprising:
 a base frame retaining a positional reference plane, and
 a plurality of rollers supporting said carriage to be linearly movably in parallel to said positional reference plane, said plurality of rollers including five first rollers rigidly coupled to said base frame and at least three-second rollers elastically coupled to said base frame,
 wherein said carriage comprises first, second, third and fourth regions in that order by a first plane passing through a gravitational center of said carriage and extending in parallel to said positional reference plane and a second plane perpendicular to said first plane, and said rollers are arranged such that at least two of said rollers are located in each of said first to fourth regions and at least four of said rollers are located in the vicinity of each of two planes perpendicular to a moving direction of said carriage, and such that two of said first rollers are located in each of said first and second regions, one of said first rollers and at least one of said second rollers are located in said third region, and at least two of said second rollers are located in said fourth region.

5. A support structure as defined in claim 4, wherein said rollers for supporting said carriage are arranged such that support force of said rollers is directed outwardly with respect to a plane in parallel to said positional reference plane of said carriage.

6. A support structure as defined in claim 4, wherein said rollers for supporting said carriage are arranged such that support force of said rollers is directed inwardly with respect to a plane in parallel to said positional reference plane of said carriage.

7. A support structure for a carriage on which an actuator is mounted, comprising a plurality of bobbin-shaped rollers supporting said carriage to be linearly movably in parallel to a positional reference plane, each of said rollers having two roller portions,
 wherein said carriage comprises first, second, third and fourth regions in that order defined by a first plane passing through a gravitational center of said carriage and extending in parallel to said positional reference plane and a second plane perpendicular to said first plane, said bobbin-shaped rollers are arranged such that two roller portions are located in each of said first to fourth regions and four roller portions are located in the vicinity of each of two planes perpendicular to a moving direction of said carriage, and such that two portions are located in each of said first and second regions are rigidly coupled to said carriage, two roller portions are located in said third region, one of which is rigidly coupled to said carriage and one of which is elastically coupled to said carriage, and two roller portions are located in said fourth regions and elastically coupled to said carriage.

8. A support structure as defined in claim 7, wherein said roller portions of said bobbin-shaped rollers supporting said carriage are arranged such that support force of said roller portions is directed outwardly with respect to a plane in parallel to said positional reference plane of said carriage.

9. A support structure as defined in claim 7, wherein said roller portions of said rollers supporting said carriage are arranged such that support force of said roller portions is directed inwardly with respect to a plane in parallel to said positional reference plane of said carriage.

10. A support structure for a carriage on which an actuator is mounted, comprising a plurality of rollers supporting said carriage to be linearly movably in parallel to a positional reference plane, said plurality of rollers including five first rollers rigidly coupled to said carriage and at least three second rollers elastically coupled to said carriage,
 wherein said carriage comprises first, second, third and fourth regions in that order defined by a first plane passing through a gravitational center of said carriage and extending in parallel to said positional reference plane and a second plane perpendicular to said first plane, said rollers are arranged such that at least two of said rollers are located in each of said first to fourth regions, at least four of said rollers are located in the vicinity of each of two planes perpendicular to a moving direction of said carriage, and at least one of said rollers is located at a position except for said two planes perpendicular to the moving direction of said carriage, and such that two of said first rollers are located in each of said first and second regions, one of said first rollers and at least one of said second rollers are located in said third region, and at least two of said second rollers are located in said fourth region.

11. A support structure as defined in claim 10, wherein said rollers supporting said carriage are arranged such that support force of said rollers is directed outwardly with respect to a plane in parallel to said positional reference plane of said carriage.

12. A support structure as defined in claim 10, wherein said rollers supporting said carriage are arranged such that support force of said rollers is directed inwardly with respect to a plane in parallel to said positional reference plane of said carriage.

13. A support structure for a carriage on which an actuator is mounted, comprising:
 a base frame retaining a positional reference plane; and
 a plurality of rollers supporting said carriage to be linearly movably in parallel to said positional reference plane, said plurality of rollers including five first rollers rigidly coupled to said base frame and at least three second rollers elastically coupled to said base frame, wherein said carriage comprises first, second, third and fourth regions in that order defined by a first plane passing through a gravitational center of said carriage and extending in parallel to said positional reference plane and a second plane perpendicular to said first plane, said rollers are arranged such that at least two of said rollers are located in each of said first to fourth regions, at least one of said rollers is located at a position except for said two planes perpendicular to a moving direction of said carriage, and at least four of said rollers are located in the vicinity of each of two planes perpendicular to the moving direction of said carriage, and such that two of said first rollers are located in each of said first and second regions, one of said first rollers and at least one of said second rollers are located in said third region, and at least two of said second rollers are located in said fourth region.

14. A support structure as defined in claim 13, wherein said rollers supporting said carriage are arranged such that support force of said rollers is directed outwardly with respect to a plane in parallel to said positional reference plane of said carriage.

15. A support structure as defined in claim 13, wherein said rollers supporting said carriage are arranged such that support force of said rollers is directed inwardly with respect to a plane in parallel to said positional reference plane of said carriage.

* * * * *